(12) United States Patent
Rubin (10) Patent No.: US 8,885,778 B2
(45) Date of Patent: Nov. 11, 2014

(54) TECHNIQUES TO MANAGE PROCESSING OF MULTIPLE INPUT MULTIPLE OUTPUT COMMUNICATIONS

(71) Applicant: Amir Rubin, Ramat Gan (IL)

(72) Inventor: Amir Rubin, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 13/715,939

(22) Filed: Dec. 14, 2012

(65) Prior Publication Data

US 2014/0169491 A1   Jun. 19, 2014

(51) Int. Cl.
*H04L 27/06* (2006.01)
*H04B 7/04* (2006.01)

(52) U.S. Cl.
CPC .................................. *H04B 7/0413* (2013.01)
USPC ............ 375/341; 375/262; 375/267; 375/299; 375/347; 455/101; 455/132; 455/500; 455/562.1; 714/794; 714/795; 714/796

(58) Field of Classification Search
CPC ............ H04L 25/067; H04L 25/03171; H04L 25/03305; H04L 25/03318; H04L 27/2647; H04L 27/2653; H04L 1/005; H04L 1/0631; H03M 13/3905; H04B 7/0413
USPC .......... 375/262, 267, 299, 341, 347; 455/101, 455/132, 500, 562.1; 714/794, 795, 796
See application file for complete search history.

(56) References Cited

U.S. PATENT DOCUMENTS

| 2004/0205445 A1 | 10/2004 | Xu |
| 2006/0148506 A1 | 7/2006 | Hoo |
| 2008/0285671 A1 | 11/2008 | Sundberg et al. |
| 2010/0067596 A1 | 3/2010 | Parkk et al. |

OTHER PUBLICATIONS

International Search Report and Written Opinion received for PCT Patent Application No. PCT/US2013/048288, mailed Sep. 26, 2013, 10 pages.
Cong Shen et al., "MIMO-OFDM Beamforming for Improved Channel Estimation", IEEE Journal on Selected Areas in Communications, Aug. 2008, 12 pages.

*Primary Examiner* — Leon Flores
(74) *Attorney, Agent, or Firm* — Kacvinsky Daisak Bluni PLLC (57) ABSTRACT

An apparatus may include a channel estimation component to determine a channel estimation matrix H for a tone of a multiplicity of tones in a multiple input multiple output (MIMO) communications signal. The apparatus may further include a processor circuit coupled to the receiver component, and a flow selection component for execution on the processor circuit to calculate a figure of merit for power loss for the received tone based upon the channel estimation matrix, and based upon the calculated figure of merit, perform either a max-log calculation or a maximum likelihood calculation to determine a received signal metric, but not both calculations. Other embodiments are described and claimed.

25 Claims, 10 Drawing Sheets

TECHNIQUES TO MANAGE PROCESSING OF MULTIPLE INPUT MULTIPLE OUTPUT COMMUNICATIONS

BACKGROUND

As the volume of wireless communications increases, newer techniques and combinations of techniques have been developed to increase efficiency and capacity for available communications spectrum. Recently, the multiple-input multiple output (MIMO) technique has been developed and deployed in a range of wireless technologies to address the need for greater data transmission rates. The MIMO technique entails the use of multiple antennae at the transmitter and receiver, where the number of receiver antennae equals or exceeds the number of transmitting antennae. By virtue of the use of multiple antennae, multiple data streams can be transmitted simultaneously from sender to receiver over the same frequency range, thereby increasing the channel transmission capacity in proportion to the number of transmitting antennae.

One MIMO scheme involves so-called Spatial Multiplexing (SM). In a SM scheme, independent streams of data are transmitted from each antenna using the same time and frequency resource. One problem that results from the fading channels exploited by MIMO systems is an increase in intersymbol interference (ISI). The orthogonal frequency division multiplexing (OFDM) technique suppresses the ISI and has therefore been adopted for deploying in combination with MIMO transmissions in various present day radio technologies.

In an OFDM/MIMO system, for instance, independent symbols are transmitted by a multiple antennae transmitting device from each antenna in the same OFDM symbol and the same subcarrier location. The streams of data combine in the air, generating interference with one another. The symbols may then be received on multiple receive antennas and are then processed in a MIMO decoder that separates the independent streams of data.

In particular, channel decoders (e.g., turbo or Low-Density Parity Check (LDPC) decoders) may be employed to properly decode the received coded waveforms. A typical input used by such decoders to perform decoding is the Logarithm of the Likelihood Ratio (LLR). The optimal output of a MIMO detector may then constitute the log-likelihood ratio (LLR) of each bit transmitted in a vector. For a single received bit, a LLR is the natural logarithm of the ratio of the likelihood functions that the originally transmitted bit was either "1" or "0".

In present day technology receivers are typically set to implement the LLR calculation using the well known maximum likelihood (ML) algorithm, which yields relatively higher performance, at the expense of increased power consumption. In particular, conventional ML decoding provides improved detection by virtue of the better ability to successfully determine which symbols are transmitted in different streams of a MIMO communication. However, the conventional ML approach suffers from complexity that increases exponentially with the number of antennae employed in the MIMO system and the modulation order.

An alternative approach that may be employed to generate LLRs is the use of the well known max-log approximation algorithm, which requires fewer calculations and results in lower power consumption by a receiver, although performance may be sacrificed. In present day wireless devices that employ only max-log calculations for LLR generation device power and cost may be reduced. However, device performance may be degraded over a wide range of MIMO channels.

Depending on the scenario for reception of a given communications signal, such as a set of symbols received by a MIMO receiver, it may be preferable to employ ML LLR generation as opposed to max-log LLR generation. However, present day wireless devices are generally configured to perform exclusively either ML or max-log decoding.

It is with respect to these and other considerations that the present improvements have been needed.

DETAILED DESCRIPTION

Various embodiments may be generally directed to systems that employ wireless communications using MIMO techniques for communication. Some embodiments may be particularly directed to techniques and architecture for processing received MIMO streams using LLR metrics.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In particular embodiments, improved techniques are provided to process signals received in an OFDM MIMO network. In embodiments using a network that employs OFDM, wireless communications of data takes place via multiple parallel channels. In particular, a serial data steam is transmitted by splitting the data stream into multiple data streams that are modulated on a separate sub-carrier (tone) in an allotted frequency spectrum. OFDM technology is presently deployed across a variety or wireless technologies including WiFi, WiMAX, and so called "4G" technologies. Some embodiments of a wireless communications system may be implemented with a radio technology such as IEEE 802.11 (WiFi), IEEE 802.16 (WiMAX); 802.16m (WiMAX rel 2, also referred to as "4G"); IEEE 802-20; 3rd generation partnership project (3GPP) long term evolution (LTE), which is a part of an evolved UMTS (E-UMTS) using the E-UTRA; LTE-advanced (LTE-A) (also referred to as "4G"), which is an evolution of the 3GPP LTE.

Figure 1:
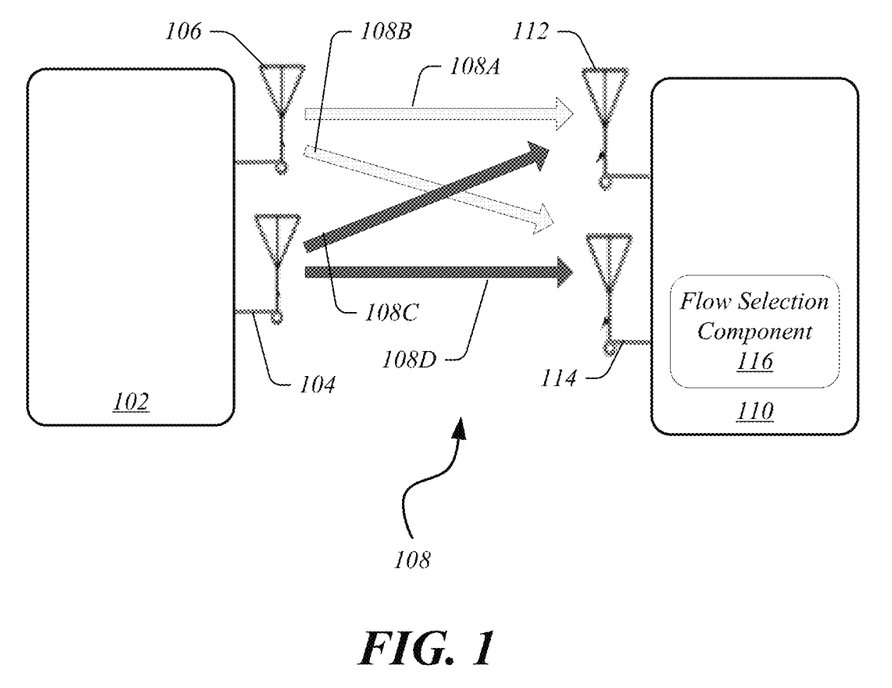
FIG. 1 illustrates one embodiment of a MIMO communications system.

FIG. 1 illustrates one arrangement 100 of a communications system consistent with the present embodiments. In the example illustrated, a first wireless communications device 102 may transmit a wireless signal 108 to a second wireless communications device 110. The wireless communications device 102 employs multiple antennae 104, 106 to transmit signals. In one example, the wireless communications device 102 may transmit according to MIMO OFDM protocol in which the signals are transmitted simultaneously over the different antennae 104, 106 using a common subcarrier. Although the scenario indicates a 2×2 MIMO configuration (two transmit antennae and 2 receive antennae), in other embodiments, a greater number of antennae may be employed at a receiver and also at a transmitter. In the example of FIG. 1, signals 108C and 108D are transmitted from the antenna 104. Notably, the signals 108C and 108D represent the same signal being simultaneously transmitted over two different signal paths. The signal 108C is received at the antenna 112 of wireless device 110, while the signal 108D is received at the wireless antennae 114 of wireless device 110. Similarly, the signals 108A and 108B represent the same signal as transmitted from the antenna 106. The signal 108A is received at the antenna 112, while the signal 108B is received at the antenna 114.

Consistent with the present embodiments, the wireless device 110 may decode data received in the wireless signal 108 by generating LLRs based upon received signal components. In particular, and as detailed with respect to the FIGs. to follow, the wireless device 110 may employ the flow selection component 116 to determine a technique to generate LLRs for one or more received tones. The received tone may be an OFDM tone, which is processed to generate a frequency domain estimation and channel estimation matrix of that tone. In particular, in various embodiments, the flow selection component 116 may determine based upon the channel estimation matrix that is estimated during reception of a MIMO signal, whether or not to apply the maximum likelihood (ML) procedure for the purpose of LLR generation. In one example, the flow selection component 116 may be set to apply ML procedure for LLR generation as a default, and to switch to a max-log scheme for LLR generation when channel characteristics are determined to justify use of the max-log scheme. Such a determination may be based upon certain criteria, such as the values of a product matrix derived from the channel estimation matrix. One example of performing a max-log procedure to determine LLR is represented by the following: LLR of bit=(normalization factor×(square distance to nearest constellation point with bit=1 to equalizer output−square distance to nearest constellation point with bit=0 to equalizer output)). An example of performing ML procedure to determine LLR is presented by ML formula: LLR of bit=(normalization factor×(square distance to most likely constellation point with bit=1 to equalizer output−square distance to most likely constellation point with bit=1 to equalizer output)).

Notably, in various embodiments the flow selection component 116 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
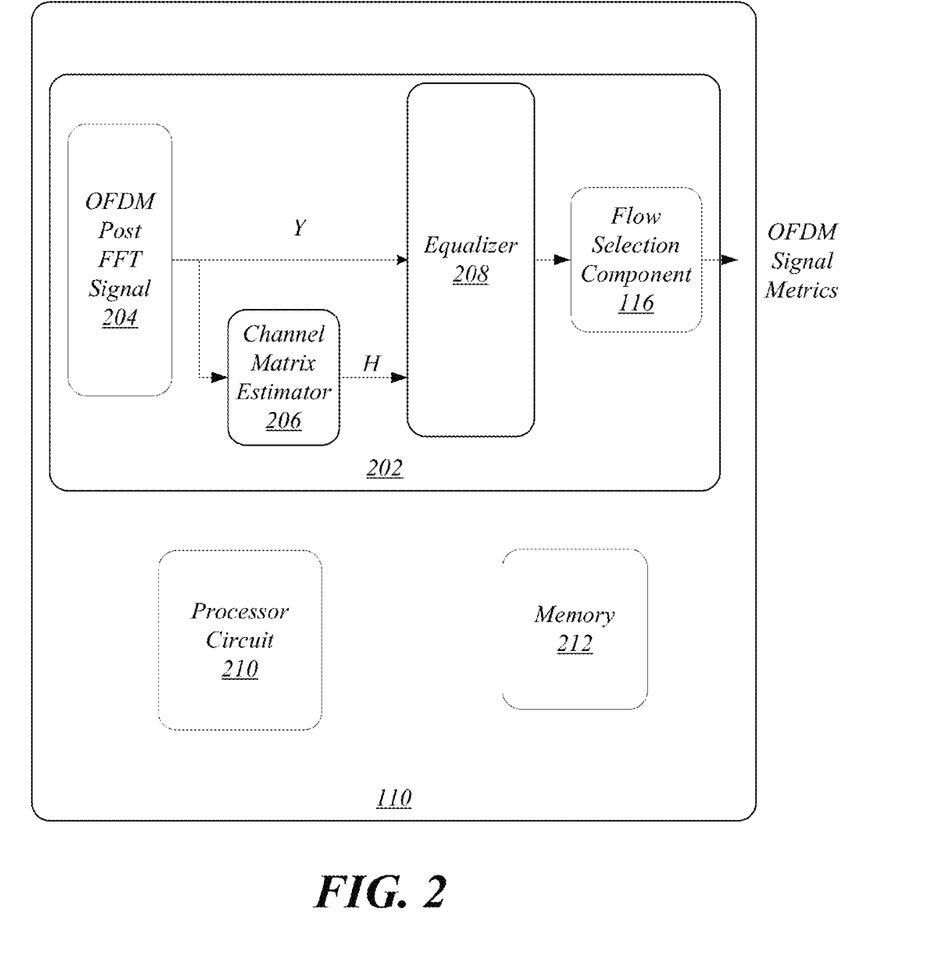
FIG. 2 illustrates one embodiment of wireless device.

FIG. 2 depicts details of an exemplary wireless device 110 according to various embodiments. In addition to a processor circuit 208 and memory 210, the wireless device 110 includes a receiver 202 for which various components are illustrated. The receiver 202 may further include conventional components to receive a radio signal such as an OFDM MIMO transmission and mix the signal to baseband, to sample and digitize the baseband signals using an analog-to-digital (ADC) converter (not shown), and to perform a fast Fourier transform (FFT) to convert the received signal to the frequency domain. As a result, the receiver may generate the OFDM post FFT signal 204 shown in FIG. 2.

The receiver 202 may also include a channel matrix estimator 206 to generate a channel matrix H which may be required for equalization of the received signal. As illustrated, the equalizer 208 may receive the frequency domain signal estimation Y and channel estimation matrix H, which may be generated for each tone of the received OFDM MIMO signal. As further illustrated in FIG. 2, the flow selection component 116 is arranged to receive the output from equalizer 208. In operation, the flow selection component 116 may dynamically determine the procedure to be employed for decoding information in each OFDM tone as received. For example, the flow selection component 116 may analyze the channel estimation information associated with an OFDM tone to determine the current channel characteristics. Based upon this determination, the procedure for analyzing the information in the received tones may be adjusted as necessary.

For example, in various embodiments, the flow selection component 116 may select between ML technique and max-log technique to generate received signal metrics. For example, the flow selection component 116 may analyze channel estimation matrix information for a received OFDM tone and adjust the procedure to generate LLRs for data received in that OFDM tone based upon the analyzed channel estimation matrix information. In this manner, the procedure for generating LLRs may be dynamically adjusted to account for differences in channel characteristics associated with different tones. This may in particular facilitate the use of max-log scheme for LLR generation when channel conditions permit, which may result in considerable power savings.

Figure 3:
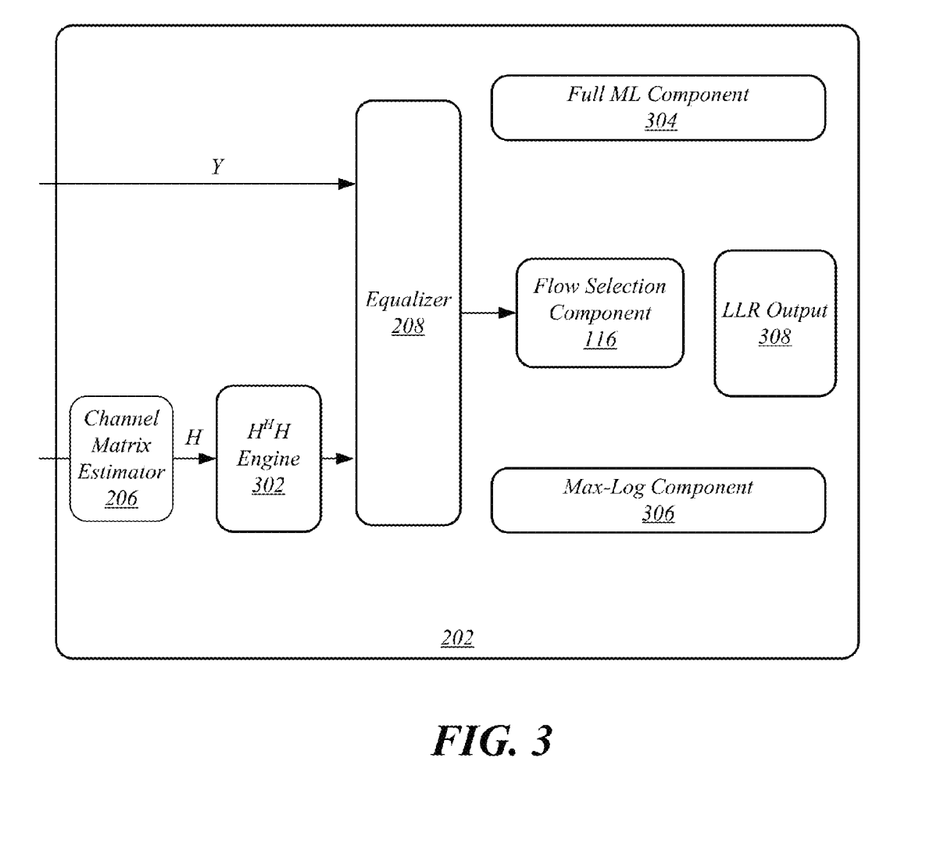
FIG. 3 illustrates one embodiment of a receiver.

FIG. 3 depicts details of another embodiment of a receiver 202. As illustrated, the receiver 202 includes a component that is termed an $H^H H$ engine 302, which is coupled to the channel matrix estimator 206. The $H^H H$ engine 302 receives the channel estimation matrix H that may be generated by the channel matrix estimator when OFDM tones are received by the receiver 202. When a channel estimation matrix H is generated by the channel matrix estimator 206, the $H^H H$ engine 302 may operate according to known procedures to generate the product matrix $H^H H$ which is a product of the channel estimation matrix H and its Hermite conjugate $H^H$.

The Equalizer 208 may then output the product matrix $H^H H$, which is received by the flow selection component 116 for each tone.

Consequently, entries in the product matrix $H^H H$ may be analyzed by the flow selection component 116 to determine a procedure to generate LLR for the given tone. For example, under certain channel conditions as indicated by analysis of the product matrix $H^H H$ the flow selection component 116 may trigger operation of the full ML component 304 to generate the LLR output 308. However, because of the increased complexity of performing a maximum likelihood algorithm to generate LLRs, it may be useful to employ max-log technique when reasonable to do so. Consistent with various embodiments, the determination to employ the max-log LLR generation may be based on the entries in the product matrix $H^H H$ which are used to identify when the channel conditions for a received tone are appropriate for max-log analysis.

In some embodiments, when the estimated channel matrix H for a given tone is received and the $H^H H$ matrix for that tone is produced, the flow selection component 116 may select either ML or max-log technique for generation of LLRs based upon examination of the main diagonal of the $H^H H$ matrix. In particular, the flow selection component 116 may trigger the use of max-log technique when a ratio of a value determined from the main diagonal of the $H^H H$ matrix to a value determined from entries outside of the main diagonal of the $H^H H$ matrix exceeds a threshold value.

Figure 4:
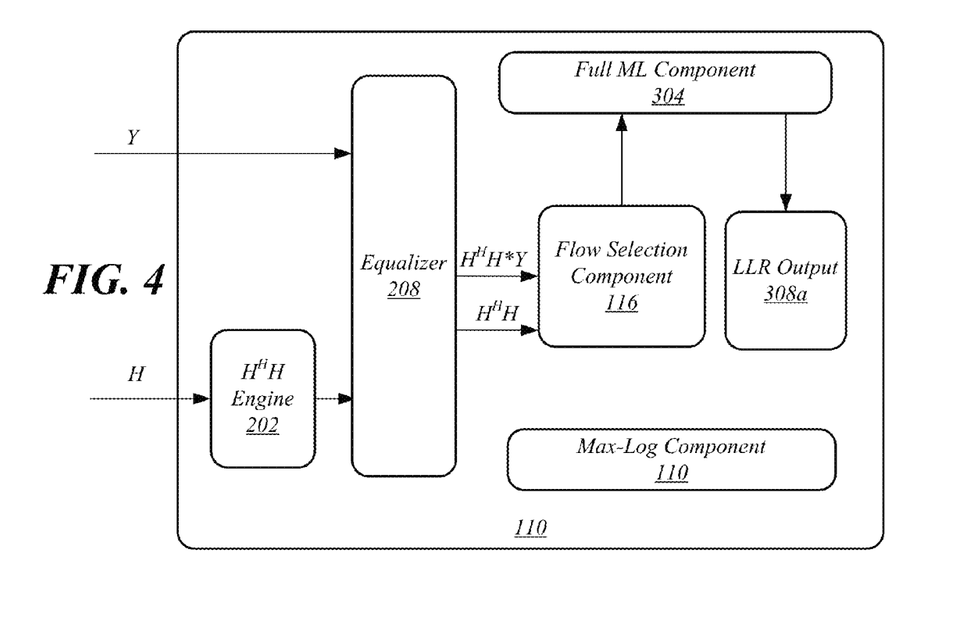
FIG. 4 depicts an exemplary scenario for LLR generation.

FIG. 4 illustrates one scenario for generation of LLR based upon a received OFDM MIMO tone. As illustrated, the frequency domain estimation Y of the OFDM MIMO tone and the channel estimation matrix H are determined. The $H^H H$ engine generates the product matrix $H^H H$, while the equalizer 208 may then output the product matrix $H^H H*Y$, which is received by the flow selection component 116 for each tone.

In particular, the flow selection component 116 may examine the $H^H H$ matrix to determine that value when entries outside of the main diagonal of the $H^H H$ are significant. In particular, the flow selection component 116 may calculate a figure of merit that is based upon a comparison between a value determined from entries of the main diagonal to a value determined from entries outside the main diagonal. Because the values of entries outside the main diagonal may indicate power loss, the ratio of values within the main diagonal to those outside the main diagonal may be used to determine when the power loss is sufficiently low that the max-log technique can be used to generate LLRs with acceptable performance.

In some examples, a function based upon matrix entries may be used to determine a figure of merit. For example, a figure of merit may be based upon a ratio of a first function based upon the value of entries in the main diagonal of an $H^H H$ matrix to a second function determined from values outside the main diagonal. In one example, the function based upon elements outside the main diagonal may be the maximum absolute value of any entry outside of the main diagonal (max(abs(x))). In another example, the function based upon elements outside the main diagonal may be a sum of a square of absolute value of any entry (sum(abs(x2))) outside the main diagonal.

In one particular embodiment the figure of merit employed by the flow selection component 116 may entail the ratio of the minimal absolute value in the main diagonal of the $H^H H$ matrix to the maximal absolute value outside the main diagonal. Thus, in the example of FIG. 4, the flow selection component 116 may identify an entry outside of the main diagonal of the $H^H H$ matrix that has a maximal absolute value of entries that lie outside the main diagonal. The flow selection component 116 may then identify the entry of the main diagonal of the $H^H H$ matrix that has the minimal absolute value of all entries in the main diagonal. Subsequently, flow selection component 116 may compare the value of the identified entry $0_{MAX}$ that represents the maximal absolute value of entries outside the main diagonal to the value of the main diagonal entry $I_{MIN}$ that represents the minimum absolute value of all entries within the main diagonal. Increases in this ratio are indicative of decreases in power loss. If the ratio of $I_{MIN}$ to $0_{MAX}$ exceeds a threshold value or critical ratio, the power loss may be deemed to have reached a sufficiently low value that the flow selection component 116 determines that the max-log technique may be employed for LLR for the OFDM MIMO tone being processed.

Returning to FIG. 4, when a determination is made that the figure of merit comparing value(s) of an entry or entries within the main diagonal of the $H^H H$ matrix to that of an entry or entries outside the main diagonal of the $H^H H$ matrix does not exceed a threshold value, the flow selection component selects the maximum likelihood (ML) algorithm for LLR generation for the OFDM MIMO tone being processed. The LLR output 308a that is forwarded for processing therefore represents a robust determination of LLR, which may be appropriate for a $H^H H$ matrix whose components outside the main diagonal have sufficiently large value compared to those within the main diagonal.

Figure 5:
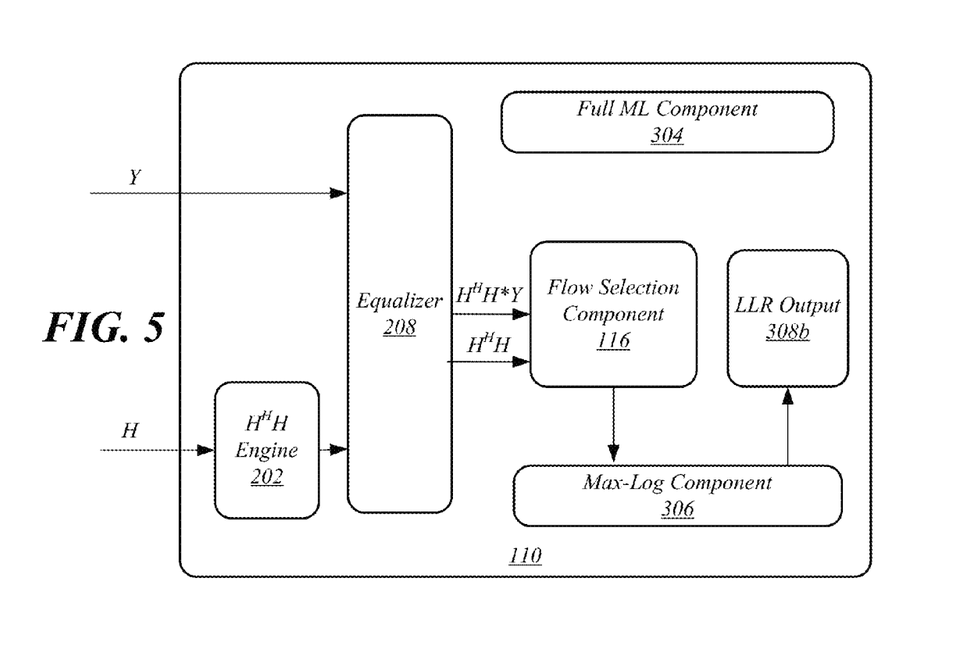
FIG. 5 depicts another exemplary scenario for LLR generation.

FIG. 5 illustrates another scenario for generation of LLR based upon a received OFDM MIMO tone. As illustrated, the frequency domain estimation Y of the OFDM MIMO tone and the channel estimation matrix H are determined. The $H^H H$ engine generates the product matrix $H^H H$, which is read by the flow selection component 116 to determine the characteristics of the tone under consideration. In this case, the flow selection component 116 may determine that value in entries outside of the main diagonal of the $H^H H$ are sufficiently small to allow the figure of merit determined from a ratio of values in the main diagonal to those outside the main diagonal to exceed a threshold value. Therefore, when the flow selection component 116 determines that the threshold value has been exceeded, the flow selection component 116 then selects the known max-log algorithm for LLR generation for the OFDM MIMO tone being processed. The LLR output 308b that is forwarded for processing therefore represents a simpler calculation of LLR, which may be appropriate for a $H^H H$ matrix whose components outside the main diagonal have relatively small value compared to those within the main diagonal.

In other embodiments the flow selection component 116 may employ other criteria to determine whether to select an ML or max-log procedure for LLR generation. For example, the flow selection component 116 may set max-log procedure for LLR generation to be employed when the $H^H H$ derived from channels estimation of a current tone being processed is entirely diagonal. In other words, max-log LLR calculations may be triggered when there are no non-zero entries outside of the main diagonal of the calculated $H^H H$ matrix. If non-zero entries are detected outside of the main diagonal, on the other hand, the flow selection component 116 may select the ML procedure for LLR generation.

In accordance with various embodiments, the threshold for switching between the use of the max-log technique and maximum likelihood technique may be adjusted to account for changed conditions. For example, as interference in channels increases or decreases, a threshold value of the ratio of $I_{MIN}$ to $0_{MAX}$ that triggers a change between ML and max-log procedures may be accordingly adjusted.

Figure 6:
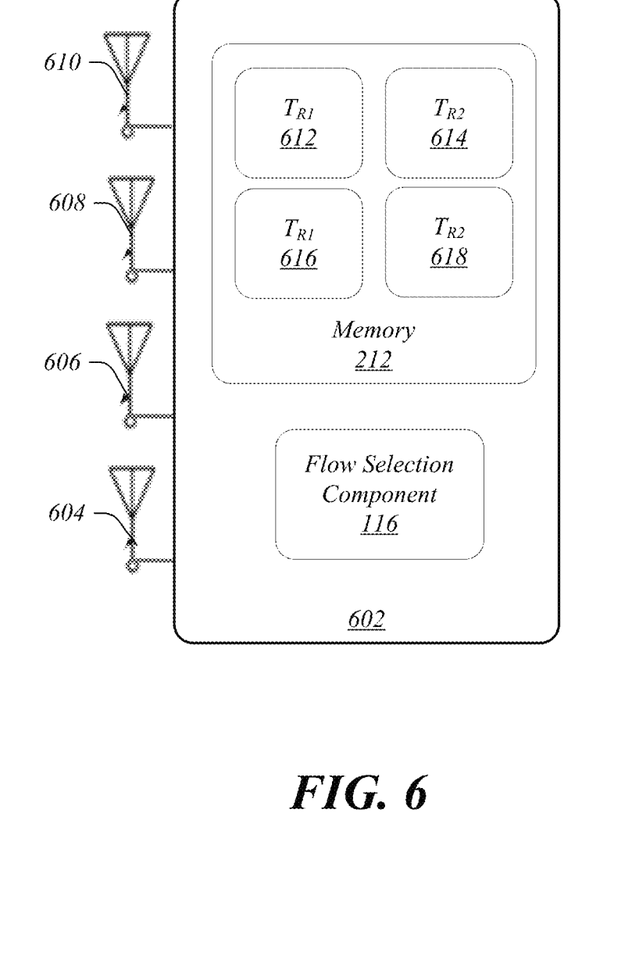
FIG. 6 is a diagram of a wireless MIMO device.

In further embodiments, the threshold value to determine switching between ML and max-log procedures may be set to different levels among different receivers in a MIMO device. For example, in a MIMO device that employs four receivers the ratio $I_{MIN}/O_{MAX}$ for the product matrix $H^H H$ may be used as the figure or merit to determine when to employ the max-log procedure. FIG. 6 illustrates an embodiment of a wireless device having four antennae 602, 604, 606, 608 to receive MIMO transmissions. The memory 212 includes four thresholds $T_{R1}$ 612, $T_{R2}$ 614, $T_{R3}$ 616, and $T_{R4}$ 618. The thresholds may correspond to different $I_{MIN}/O_{MAX}$ ratios as discussed above. A first $I_{MIN}/O_{MAX}$ ratio may be set as the threshold value ($T_{R1}$ 612) to trigger change between ML and max-log LLR generation for a first receiver of the MIMO device coupled to antenna 604, while a second $I_{MIN}/O_{MAX}$ ratio is set as the threshold value ($T_{R2}$ 614) to trigger change between ML and max-log LLR generation for a second receiver of the MIMO device coupled to antenna 606, a third $I_{MIN}/O_{MAX}$ ratio is set as the threshold value ($T_{R2}$ 614) to trigger change between ML and max-log LLR generation for a third receiver of the MIMO device coupled to antenna 608, and so forth.

In various other embodiments, the flow selection component 116 may alter the procedure for tone processing based upon the characteristics of the transmitter. In one instance, if a receiving device, such as wireless communications device 110, associates with an access point that employs beamforming, the flow selection component 116 may set the max-log technique as a default procedure for LLR generation since it may be expected that the max-log procedure may operate properly in most tones when beamforming is employed. Under beamforming channel state information is required at both receiver and transmitter and a MIMO channel is separated into parallel independent channels.

When no beamforming is performed, the flow selection component may still select between ML and max-log procedures according to analysis of the $H^H H$ matrix as disclosed hereinabove.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
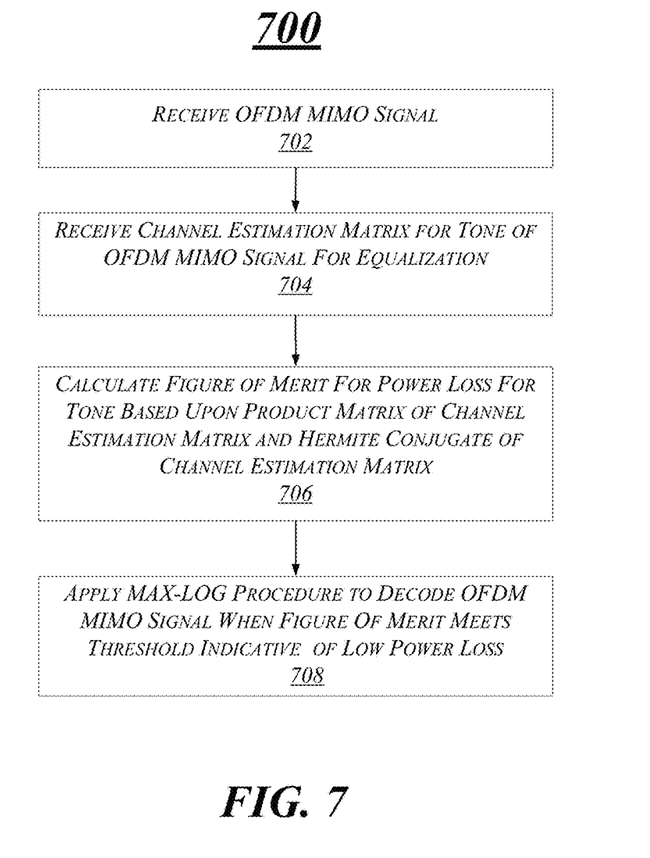
FIG. 7 depicts an exemplary first logic flow.

FIG. 7 depicts an exemplary first logic flow 700. The logic flow 700 may be implemented, for example, in receiver of a wireless device. At block 702 an OFDM MIMO signal is received. In various embodiments, the OFDM wireless device may include 2, 4, or any number of antennae.

The flow then proceeds to block 704, where a channel estimation matrix is received for a tone of the OFDM MIMO signal for equalization. The flow then proceeds to block 706, where a calculation of a figure of merit for power loss for a tone is performed based upon a product matrix $H^H H$ of the channel estimation matrix and its Hermite conjugate.

The flow then proceeds to block 708. At the block 708 a max-log procedure is applied to decode an OFDM MIMO signal when the figure of merit exceeds a threshold that indicates a low power loss condition. In some instances the figure of merit may represent a ratio of values within the main diagonal to those outside the main diagonal of the product matrix $H^H H$.

Figure 8:
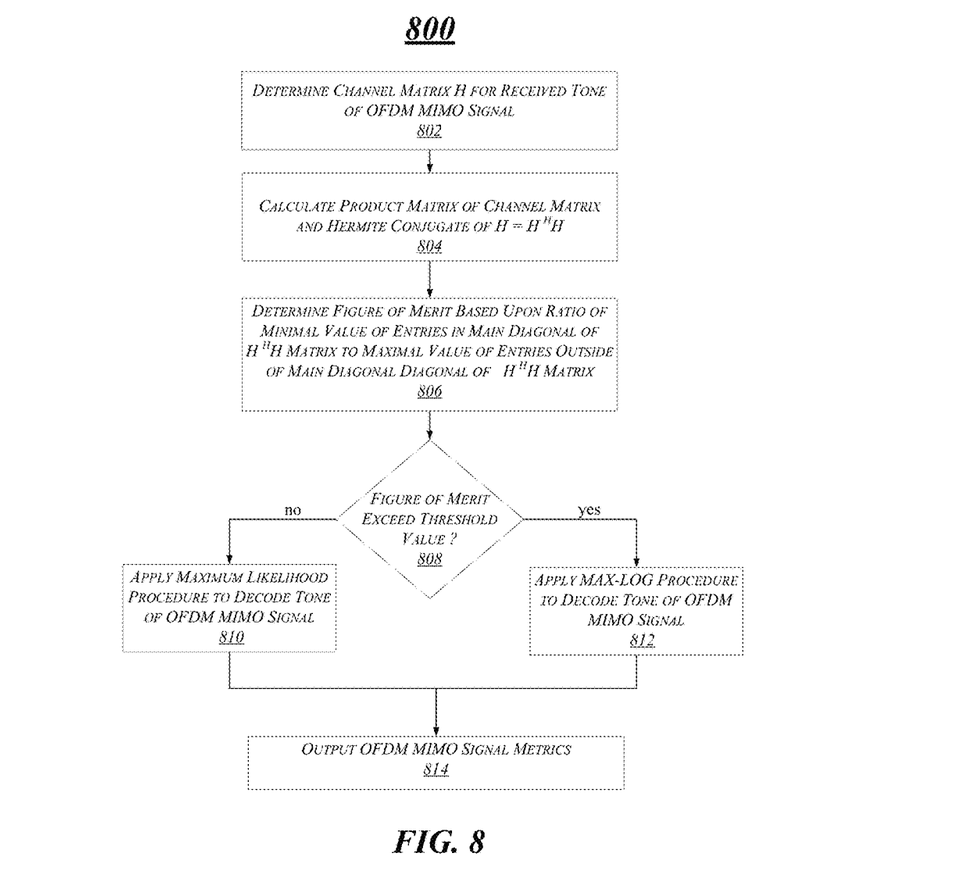
FIG. 8 depicts an exemplary second logic flow.

FIG. 8 depicts an exemplary second logic flow 800. At block 802 a channel matrix H is determined for a received tone of an OFDM MIMO signal. At block 804 a product matrix $H^H H$ of the channel matrix and its Hermite conjugate is calculated. The flow then proceeds to the block 806, where a figure of merit is determined based upon a ratio of a minimal value in the main diagonal of the $H^H H$ matrix to a maximum value of entries outside the main diagonal. The flow then proceeds to decision block 808.

At the decision block 808 a determination is made as to whether the figure of merit exceeds a threshold value. If not, the flow moves to block 810. At block 810 a maximum likelihood procedure is applied to decode the tone of the OFDM MIMO signal.

If the threshold is exceeded, the flow moves to block 812, where the max-log procedure is applied to decode the tone of the OFDM MIMO signal. After either of blocks 810, 812 the flow moves to block 814 where the OFDM signal metrics are output.

Figure 9:
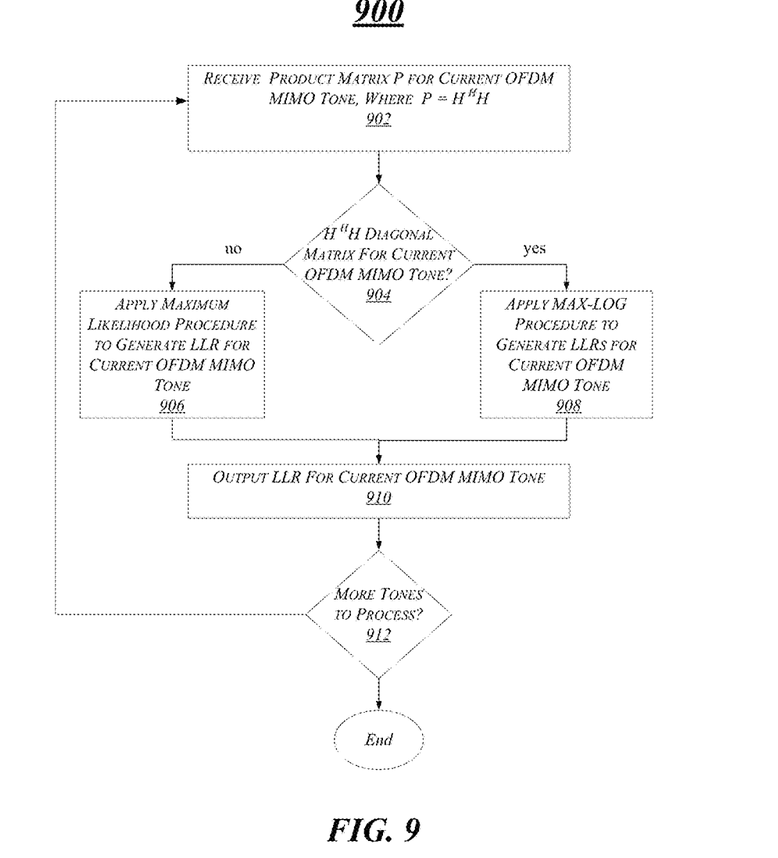
FIG. 9 depicts an exemplary third logic flow.

FIG. 9 depicts an exemplary third logic flow 900. At block 902 a product matrix P is received for a current OFDM MIMO tone, where P=$H^H H$ The flow then proceeds to decision block 904. At the block 904 a determination is made as to whether the $H^H H$ matrix is a diagonal matrix for the current tone. If the matrix is not diagonal, the flow proceeds to block 906 where a maximum likelihood procedure is applied to generate LLR for the current OFDM MIMO tone. If the $H^H H$ matrix is diagonal, the flow proceeds to block 908 where a max-log procedure is applied to generate LLR for the current OFDM MIMO tone.

The flow then proceeds to block 910 where an LLR is output for the current OFDM MIMO tone. The flow subsequently proceeds to block 912, where a determination is made as to whether more tones are to be processed. If so, the flow returns to block 902.

Figure 10:
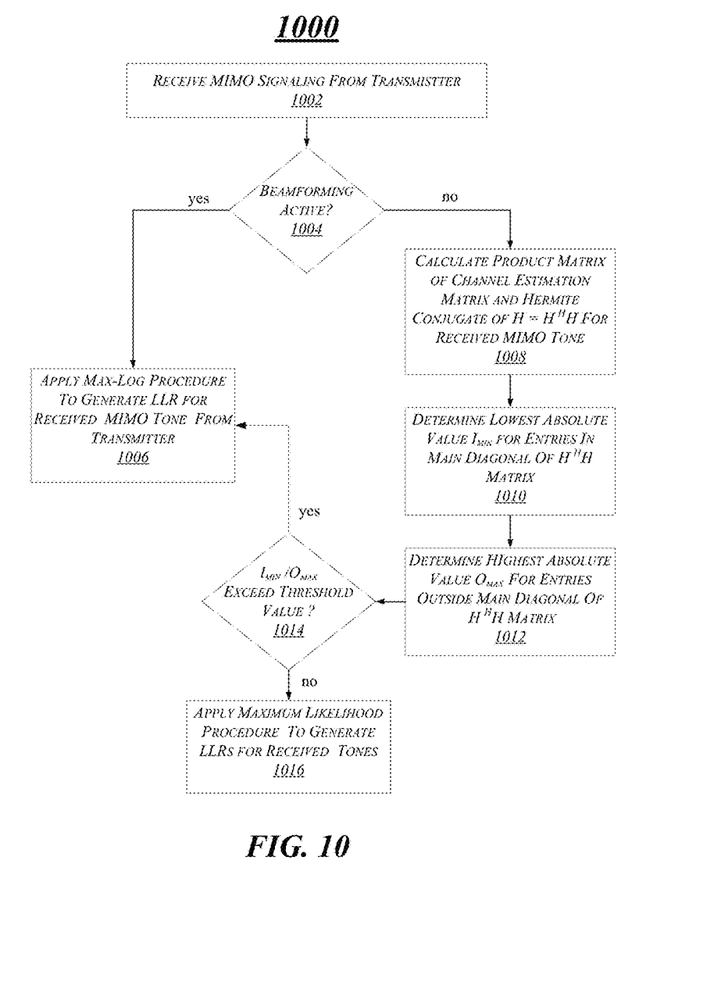
FIG. 10 depicts an exemplary fourth logic flow.

FIG. 10 depicts an exemplary fourth logic flow 1000. At block 1002 MIMO signaling is received from a transmitter, such as an access point. The access point may transmit signals such as OFDM signals in one example. The flow proceeds to the decision block 1004 where a determination is made as to whether beamforming is active at the transmitter. If so the flow proceeds to the block 1006 in which a max-log procedure is applied to generate an LLR for a MIMO tone received from the transmitter.

If beamforming is not currently employed by the access point, the flow proceeds to block 1008. At the block 1008, a product matrix is calculated for a received OFDM MIMO tone from the access point. The product matrix $H^H H$ is formed by multiplying a channel estimation matrix by its Hermite conjugate.

The flow then proceeds to block 1010 where the lowest absolute value $I_{MIN}$ is determined from entries that lie within the main diagonal of the $H^H H$ matrix. The flow then proceeds to block 1012 where the highest absolute $O_{MAX}$ of entries that lie outside the main diagonal is determined. The flow then proceeds to the decision block 1014.

At the decision block 1014, a determination is made as to whether a ratio of $I_{MIN}/O_{MAX}$ exceeds a threshold value. If the threshold is exceeded, the flow returns to block 1006 where a max-log procedure is applied to generate LLRs for received tones from the access point.

If $I_{MIN}/O_{MAX}$ does not exceed the threshold, the flow proceeds to block 1016. At the block 1016, a maximum likelihood procedure is applied to generate an LLR for the received MIMO tone.

Figure 11:
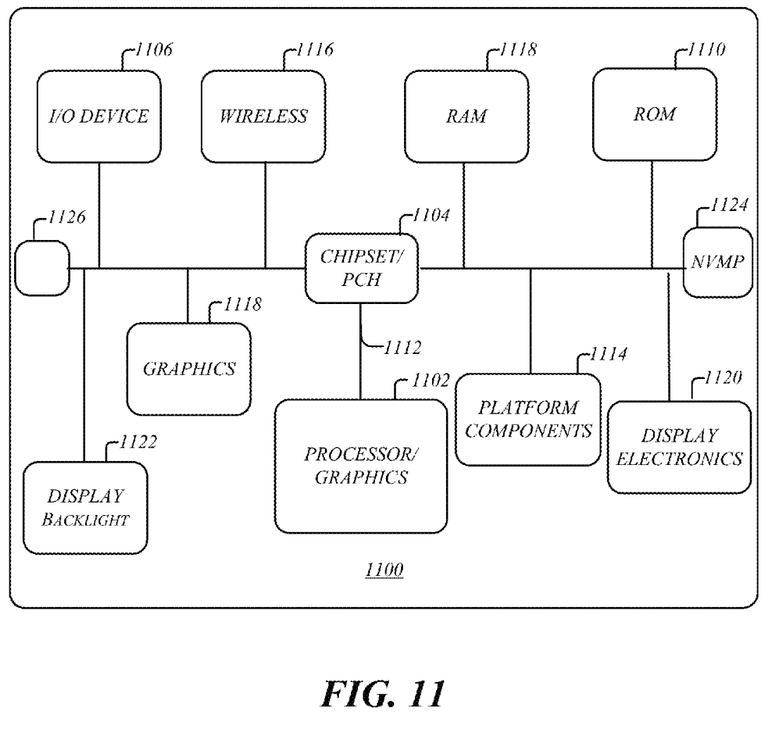
FIG. 11 depicts an exemplary system embodiment.

FIG. 11 is a diagram of an exemplary system embodiment and in particular, FIG. 11 is a diagram showing a platform 1100, which may include various elements. For instance, FIG. 11 shows that platform (system) 1100 may include a processor/graphics core 1102, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 1116 and graphics device 1118. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a processor circuit and a channel matrix estimator for execution on the processor circuit to determine a channel estimation matrix H for a tone of a multiplicity of tones in a multiple input multiple output (MIMO) communications signal. The apparatus may also include a flow selection component for execution on the processor circuit to calculate a figure of merit for power loss for the received tone based upon the channel estimation matrix, and based upon the calculated figure of merit, perform either a max-log calculation or a maximum likelihood calculation to determine a received signal metric, but not both calculations.

In another embodiment, the received signal metric may be a log likelihood ratio (LLR) of received data of the received tone.

Alternatively, or in addition, in a further embodiment, the flow selection component may be for execution on the processor circuit to form a Hermite $H^H$ conjugate of the channel estimation matrix, to multiply the channel estimation matrix by the Hermite conjugate of the channel estimation matrix to form a product matrix $H^H H$, and to calculate the figure of merit from a ratio of a value determined from entries in the main diagonal of the product matrix $H^H H$ to a value determined from entries outside of the main diagonal $H^H H$.

Alternatively, or in addition, in a further embodiment, the flow selection component may be for execution on the processor circuit to perform a max-log calculation to determine the signal metric when the ratio between minimal absolute value in the main diagonal of the product matrix and the maximal absolute value outside the main diagonal of the product matrix is above the threshold, and to perform a maximum likelihood calculation to determine the signal metric when the ratio between minimal absolute value in the main diagonal of the product matrix and the maximal absolute value outside the main diagonal of the product matrix is below the threshold.

Alternatively, or in addition, in a further embodiment, the flow selection component may be for execution on the processor circuit to perform a max-log calculation to determine the signal metric when a ratio between an absolute value in the main diagonal of the product matrix and a sum squares of absolute value of entries outside of the main diagonal is above a threshold, and to perform a maximum likelihood calculation to determine the signal metric when the ratio between an absolute value in the main diagonal of the product matrix and a sum squares of absolute value of entries outside of the main diagonal is below the threshold.

Alternatively, or in addition, in a further embodiment, the flow selection component may be for execution on the processor circuit to perform a max-log calculation to determine the signal metric when a product matrix $H^H H$ formed by multiplying the channel estimation matrix by its Hermite conjugate is completely diagonal, all entries outside of a main diagonal of the product matrix containing only zero values.

Alternatively, or in addition, in a further embodiment, the flow selection component may be for execution on the processor circuit to determine whether the MIMO communications signal comprises a beamforming signal, and to apply a max-log procedure to generate LLR for the received tone when the MIMO communications signal comprises a beamforming signal.

Alternatively, or in addition, in a further embodiment, the flow selection component may be for execution on the processor circuit to adjust the threshold according to a receiver identity associated with the received tone.

Alternatively, or in addition, in a further embodiment, the MIMO communications signal may be an orthogonal frequency division multiplexing (OFDM) signal.

Alternatively, or in addition, in a further embodiment, the apparatus may include a digital display to present results of data received in the wireless communications signal.

In another embodiment, a computer implemented method may include receiving a wireless communications multiple input multiple output (MIMO) communications signal comprising a multiplicity of tones, determining a channel estimation matrix H for a tone of a multiplicity of tones, calculating a figure of merit for power loss for the tone based upon the channel estimation matrix, and based upon the calculated figure of merit, performing either a max-log calculation or a maximum likelihood calculation to determine a received signal metric, but not both calculations.

In a further embodiment of the computer implemented method, the received signal metric may be a log likelihood ratio (LLR) of received data of the one received tone.

Alternatively, or in addition, in a further embodiment, the computer implemented method may include forming a Hermite $H^H$ conjugate of the channel estimation matrix, multiplying the channel estimation matrix by the Hermite conjugate of the channel estimation matrix to form a product matrix $H^H H$, and calculating the figure of merit from a ratio of a value determined from entries in the main diagonal of the product matrix $H^H H$ to a value determined from entries outside of the main diagonal $H^H H$.

Alternatively, or in addition, in a further embodiment, the computer implemented method may include performing a max-log calculation to determine the signal metric when the ratio between minimal absolute value in the main diagonal of the product matrix and the maximal absolute value outside the main diagonal of the product matrix is above the threshold, and performing a maximum likelihood calculation to determine the signal metric when the ratio between minimal absolute value in the main diagonal of the product matrix and the maximal absolute value outside the main diagonal of the product matrix is below the threshold.

Alternatively, or in addition, in a further embodiment, the computer implemented method may include performing a max-log calculation to determine the signal metric when a ratio between an absolute value in the main diagonal of the product matrix and a sum squares of absolute value of entries outside of the main diagonal is above a threshold and performing a maximum likelihood calculation to determine the signal metric when the ratio between an absolute value in the main diagonal of the product matrix and a sum squares of absolute value of entries outside of the main diagonal is below the threshold.

Alternatively, or in addition, in a further embodiment, the computer implemented method may include performing a max-log calculation to determine the signal metric when a product matrix $H^H H$ formed by multiplying the channel estimation matrix by its Hermite conjugate is completely diagonal, all entries outside of a main diagonal of the product matrix containing only zero values.

Alternatively, or in addition, in a further embodiment, the computer implemented method may include determining whether the MIMO communications signal comprises a beamforming signal, and applying a max-log procedure to generate LLR for the received tone when the MIMO communications signal comprises a beamforming signal.

Alternatively, or in addition, in a further embodiment, the computer implemented method may include adjusting the threshold according to a receiver identity associated with the received tone.

Alternatively, or in addition, in a further embodiment of the computer implemented method the MIMO communications signal may be an orthogonal frequency division multiplexing (OFDM) signal.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

The invention claimed is:

1. An apparatus, comprising:
  a processor circuit;
  a channel matrix estimator for execution on the processor circuit to determine a channel estimation matrix H for a tone of a multiplicity of tones in a multiple input multiple output (MIMO) communications signal; and
  a flow selection component for execution on the processor circuit to:
    form a Hermite $H^H$ conjugate of the channel estimation matrix;
    multiply the channel estimation matrix by the Hermite conjugate of the channel estimation matrix to form a product matrix $H^H H$; and
    calculate a figure of merit for power loss for the received tone from a ratio of a value determined from entries in the main diagonal of the product matrix $H^H H$ to a value determined from entries outside of the main diagonal $H^H H$; and
    based upon the calculated figure of merit, perform either a max-log calculation or a maximum likelihood calculation to determine a received signal metric, but not both calculations.

2. The apparatus of claim 1, the received signal metric comprising a log likelihood ratio (LLR) of received data of the received tone.

3. The apparatus of claim 1, the flow selection component for execution on the processor circuit to:
  perform a max-log calculation to determine the signal metric when a ratio between minimal absolute value in the main diagonal of the product matrix and maximal absolute value outside the main diagonal of the product matrix is above the threshold; and
  perform a maximum likelihood calculation to determine the signal metric when the ratio between minimal absolute value in the main diagonal of the product matrix and the maximal absolute value outside the main diagonal of the product matrix is below the threshold.

4. The apparatus of claim 1, the flow selection component for execution on the processor circuit to:
  perform a max-log calculation to determine the signal metric when a ratio between an absolute value in the main diagonal of the product matrix and a sum squares of absolute value of entries outside of the main diagonal is above a threshold; and
  perform a maximum likelihood calculation to determine the signal metric when the ratio between an absolute value in the main diagonal of the product matrix and a sum squares of absolute value of entries outside of the main diagonal is below the threshold.

5. The apparatus of claim 1, the flow selection component for execution on the processor circuit to perform a max-log calculation to determine the signal metric when a product matrix $H^H H$ formed by multiplying the channel estimation matrix by its Hermite conjugate is completely diagonal, all entries outside of a main diagonal of the product matrix containing only zero values.

6. The apparatus of claim 1, the flow selection component for execution on the processor circuit to:
  determine whether the MIMO communications signal comprises a beamforming signal; and
  apply a max-log procedure to generate LLR for the received tone when the MIMO communications signal comprises a beamforming signal.

7. The apparatus of claim 1 the flow selection component for execution on the processor circuit to adjust the threshold according to a receiver identity associated with the received tone.

8. The apparatus of claim 1, the MIMO communications signal comprising an orthogonal frequency division multiplexing (OFDM) signal.

9. The apparatus of claim 1, comprising a digital display to present results of data received in the wireless communications signal.

10. At least one non-transitory computer-readable storage medium comprising instructions that, when executed, cause a system to:
  determine a channel estimation matrix H for a tone of a multiplicity of tones in a multiple input multiple output (MIMO) communications signal;
  form a Hermite $H^H$ conjugate of the channel estimation matrix;
  multiply the channel estimation matrix by the Hermite conjugate of the channel estimation matrix to form a product matrix $H^H H$; and calculate a figure of merit for power loss for the received tone from a ratio of a value determined from entries in the main diagonal of the product matrix $H^H H$ to a value determined from entries outside of the main diagonal $H^H H$; and based upon the calculated figure of merit, perform either a max-log calculation or a maximum likelihood calculation to determine a received signal metric, but not both calculations.

11. The at least one non-transitory computer-readable storage medium of claim 10, the received signal metric comprising a log likelihood ratio (LLR) of received data of the received tone.

12. The at least one non-transitory computer-readable storage medium of claim 10 comprising instructions that, when executed, cause the system to:
perform a max-log calculation to determine the signal metric when the ratio between minimal absolute value in the main diagonal of the product matrix and the maximal absolute value outside the main diagonal of the product matrix is above the threshold; and
perform a maximum likelihood calculation to determine the signal metric when the ratio between minimal absolute value in the main diagonal of the product matrix and the maximal absolute value outside the main diagonal of the product matrix is below the threshold.

13. The at least one non-transitory computer-readable storage medium of claim 10 comprising instructions that, when executed, cause the system to:
perform a max-log calculation to determine the signal metric when a ratio between an absolute value in the main diagonal of the product matrix and a sum squares of absolute value of entries outside of the main diagonal is above a threshold; and
perform a maximum likelihood calculation to determine the signal metric when the ratio between an absolute value in the main diagonal of the product matrix and a sum squares of absolute value of entries outside of the main diagonal is below the threshold.

14. The at least one non-transitory computer-readable storage medium of claim 10 comprising instructions that, when executed, cause the system to perform a max-log calculation to determine the signal metric when a product matrix $H^H H$ formed by multiplying the channel estimation matrix by its Hermite conjugate is completely diagonal, all entries outside of a main diagonal of the product matrix containing only zero values.

15. The at least one non-transitory computer-readable storage medium of claim 10 comprising instructions that, when executed, cause the system to:
determine whether the MIMO communications signal comprises a beamforming signal; and
apply a max-log procedure to generate LLR for the received tone when the MIMO communications signal comprises a beamforming signal.

16. The at least one non-transitory computer-readable storage medium of claim 10 comprising instructions that, when executed, cause the system to adjust the threshold according to a receiver identity associated with the received tone.

17. The at least one non-transitory computer-readable storage medium of claim 10, the MIMO signal comprising an orthogonal frequency division multiplexing (OFDM) signal.

18. A computer implemented method, comprising:
receiving a wireless communications multiple input multiple output (MIMO) communications signal comprising a multiplicity of tones;
determining a channel estimation matrix H for a tone of a multiplicity of tones;
forming a Hermite $H^H$ conjugate of the channel estimation matrix;
multiplying the channel estimation matrix by the Hermite conjugate of the channel estimation matrix to form a product matrix $H^H H$; and
calculating a figure of merit for power loss for the received tone from a ratio of a value determined from entries in the main diagonal of the product matrix $H^H H$ to a value determined from entries outside of the main diagonal $H^H H$; and
based upon the calculated figure of merit, performing either a max-log calculation or a maximum likelihood calculation to determine a received signal metric, but not both calculations.

19. The computer implemented method of claim 18, the received signal metric comprising log likelihood ratio (LLR) of received data of the received tone.

20. The computer implemented method of claim 18, comprising:
performing a max-log calculation to determine the signal metric when the ratio between minimal absolute value in the main diagonal of the product matrix and the maximal absolute value outside the main diagonal of the product matrix is above the threshold; and
performing a maximum likelihood calculation to determine the signal metric when the ratio between minimal absolute value in the main diagonal of the product matrix and the maximal absolute value outside the main diagonal of the product matrix is below the threshold.

21. The computer implemented method of claim 18, comprising:
performing a max-log calculation to determine the signal metric when a ratio between an absolute value in the main diagonal of the product matrix and a sum squares of absolute value of entries outside of the main diagonal is above a threshold; and
performing a maximum likelihood calculation to determine the signal metric when the ratio between an absolute value in the main diagonal of the product matrix and a sum squares of absolute value of entries outside of the main diagonal is below the threshold.

22. The computer implemented method of claim 18, comprising performing a max-log calculation to determine the signal metric when a product matrix $H^H H$ formed by multiplying the channel estimation matrix by its Hermite conjugate is completely diagonal, all entries outside of a main diagonal of the product matrix containing only zero values.

23. The computer implemented method of claim 18, comprising:
determining whether the MIMO communications signal comprises a beamforming signal; and
applying a max-log procedure to generate LLR for the received tone when the MIMO communications signal comprises a beamforming signal.

24. The computer implemented method of claim 18, comprising adjusting the threshold according to a receiver identity associated with the received tone.

25. The computer implemented method of claim 18, the MIMO communications signal comprising an orthogonal frequency division multiplexing (OFDM) signal.

* * * * *